Sept. 6, 1932. E. G. JONES 1,875,738
PIPE MOLDING APPARATUS
Filed Aug. 15, 1930
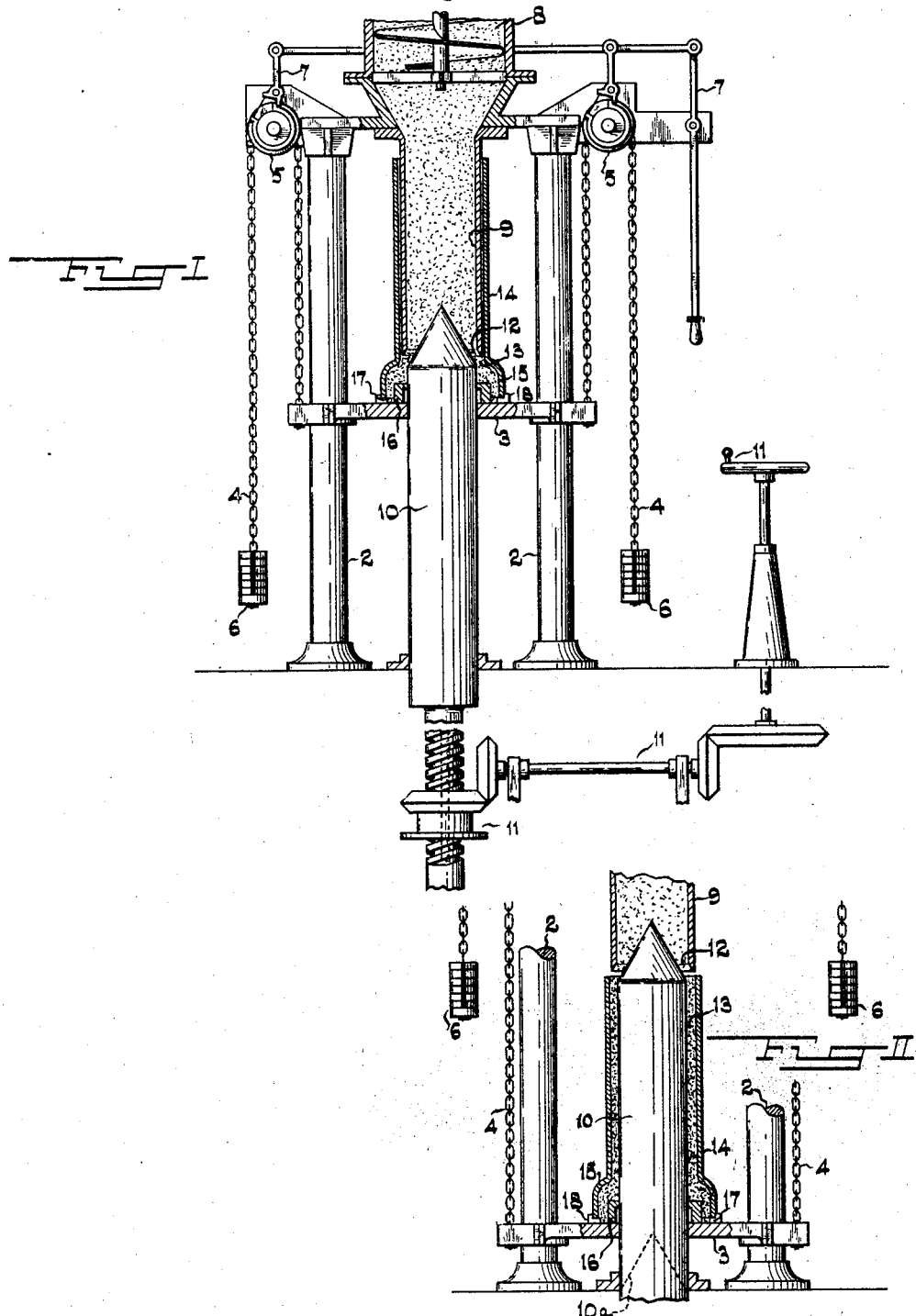
Inventor:
Edward George Jones
By [signature] Attorney Patented Sept. 6, 1932

1,875,738

UNITED STATES PATENT OFFICE

EDWARD GEORGE JONES, OF VEREENIGING, TRANSVAAL, UNION OF SOUTH AFRICA

PIPE MOLDING APPARATUS

Application filed August 15, 1930, Serial No. 475,522, and in the Union of South Africa September 16, 1929.

The present invention relates to the manufacture of pipes from plastic material and particularly from clay, by the method in which the amorphous plastic mass is forced from a container and in being so forced is shaped into a pipe.

Clay pipes thus produced by the present usual extrusion methods are defective by reason of the laminations which appear in the body of the pipe. The laminations diminish the mechanical strength of the pipe by reason of the imperfect cohesion at the faces of the laminations; and cause blisters to form during the burning operation, on account of which a large proportion of the pipes now made have to be discarded.

It is believed that there are two principal causes of laminations, viz. the frictional resistance of the clay against the surfaces of the die or other fixed parts over which it flows, causing the flow of external layers of clay to be retarded as compared with the internal layers, and the degree of dryness of the plastic clay which is found to be necessary in order that the extruded body of clay may be reasonably self-sustaining.

The object of the present invention is to produce a denser and more homogeneously shaped pipe than that produced in the present practice and particularly to diminish the occurrence of laminations.

According to this invention the plastic material is forced under pressure into an elongated mold cavity of pipe. The mold cavity is progressively extended lengthwise and is correspondingly progressively filled with the plastic material under pressure.

The pressure is conveniently maintained and the progressive extension of the mold cavity produced by opposing the extension of the mold by a constantly applied force which is overcome by the pressure of the material within the mold cavity.

According also to this invention apparatus for carrying out the method comprises an elongated nozzle through which the plastic material is forced under pressure, an annular mold cavity provided by an outer mold casing which surrounds and slides on the nozzle and an inner central core member, the upper end of which forms an annular orifice during the molding operation, means for forcing the plastic material into the mold cavity and further means yieldingly opposing the relative extension of the mold casing and the nozzle so as to maintain the material in the mold cavity under pressure.

The pressure to which the plastic material is subjected as it is deposited in the mold cavity tends to weld together any incipient laminations which may have been set up during its flow into the mold. Moreover the mold casing and central core provide mechanical support for the mass confined within the mold, so that in making clay pipes a wetter mixture can be used than that which is necessary when the clay is extruded into the open air and has therefore to be stiff enough to be self-supporting; and this increased wetness of the clay contributes to the welding of the laminations.

The production of laminations is additionally avoided by the arrangement of the nozzle above described whereby the plastic material is deposited without movement along the outer wall of the mold.

The invention is illustrated in the accompanying drawing in which:—

Fig. I is a partly sectioned elevation of a pipe making machine,

Fig. II shows a portion of Fig. I with the movable parts in a different position.

In Fig. I there are shown certain parts of the known type of pipe extruding machine comprising a frame-work 2 which guides a vertically sliding table 3. The table is yieldingly supported by chains 4 passing over pulleys 5 and provided with counterweights 6. The table can be secured at any desired height by brake mechanism 7 which locks the pulleys 5. A press 8 is provided for forcing plastic clay downwardly through the nozzle 9.

According to this invention, the core member 10 extends upwardly through the table and is provided with mechanism 11 by which it can be raised and lowered or held rigidly in the position shown in Fig. I. The nozzle 9 forms with said core member the annular orifice 12 through which an annular rod of clay is forced into the mold cavity 13 provided between the core member 10 and the mold casing 14. Said casing is of the necessary length and form to contain the completed raw pipe. For making a socketed pipe, its lower end is formed with a bell 15 and a socket former 16 is provided which is similar to the usual socket former except that it is pierced to pass over the core member 10.

The nozzle 9 is elongated so that the casing 14 can be passed up over it, and by thus occupying the mold cavity it prevents the entrance of clay thereinto.

With the parts positioned as in Fig. I the operation of making a pipe is as follows. Clay is forced down through the nozzle 14 by the press 8 and fills the bell 15 in by flowing through the bell cavity in the ordinary manner; the usual spew holes 17 being provided as by raising the mold on spaced blocks 18. Upon the cavity of the bell 15 being filled, the formation of the pipe proper in the novel manner begins by the entry of the clay into the mold cavity 13.

The pressure of the clay is resisted by the mold casing 14, the core 10 and the table 3. Only the latter can yield and does so by descending but only in the circumstance that the clay in the mold cavity is under the pressure necessary to lift the counterweights 6. These weights are for this purpose made heavier than in the present practice; and it has been found suitable to make them sufficiently heavy to maintain the clay within the mold under a pressure of about 25 pounds per square inch.

The continued flow of clay from the nozzle 14 drives the table downwards, and the mold casing 14 moves down with the table 3, thereby sliding down over the nozzle. That is to say, as each small portion of clay passes from the nozzle it is deposited within the mold casing in its proper position therein and does not thereafter move relatively thereto. As the force acting to fill the mold cavity and the force resisting the filling are continuous and substantially constant, each small portion of clay is also deposited under the same degree of pressure so that the pipe material is densely and uniformly packed throughout the length of the pipe.

Finally the mold passes off the nozzle as shown in Fig. II. Clay spews out of the gap between them, whereupon the press is stopped and the brakes 7 are applied to prevent the table from rising. The core 10 is next withdrawn from the lower end of the mold casing as indicated by the dotted lines 10a, Fig. II. The mold casing containing the formed pipe is removed from the table and from the socket former 16 and placed in a position for drying; the mold serving the useful purpose of protecting and supporting the raw pipe during transportation and drying. The contraction of the pipe which accompanies its drying renders it readily removable from the mold.

I claim:—

1. In a pipe making machine the combination of a press, an elongated nozzle through which plastic material is forced by the press, a core arranged co-axially with the nozzle and so that its upper end forms an annular die with said nozzle, a mold casing surrounding and slidable lengthwise over the nozzle, and yielding means for supporting said casing against sliding movement over said nozzle, the core extending through said means, being longer than the mold casing and being adjustable to enable it to be withdrawn from the mold casing.

2. In a pipe molding machine the combination of a press, an elongated nozzle through which the plastic material is forced by the press, a mold casing surrounding said nozzle and movable axially relatively thereto, yielding means supporting said casing against sliding movement over said nozzle and a central core member extending through said means and arranged to be stationary while the mold is being filled so as to occupy the whole length of the mold casing at the completion of the molding operation and removable to withdraw it from the molded pipe.

In testimony whereof I affix my signature.

EDWARD GEORGE JONES.